(12) United States Patent
Baumert et al.

(10) Patent No.: US 7,862,872 B2
(45) Date of Patent: Jan. 4, 2011

(54) MULTILAYER STRUCTURE BASED ON POLYAMIDES AND GRAFT COPOLYMERS HAVING POLYAMIDE BLOCKS

(75) Inventors: Martin Baumert, Serquigny (FR); Sëbastien Micheneau, Evreux Saint Michel (FR); Thibault Montanari, Bernay (FR)

(73) Assignee: Arkema France, Colombes Cedex (FR)

( * ) Notice: Subject to any disclaimer, the term of this patent is extended or adjusted under 35 U.S.C. 154(b) by 529 days.

(21) Appl. No.: 10/804,191

(22) Filed: Mar. 19, 2004

(65) Prior Publication Data
US 2005/0112312 A1    May 26, 2005

Related U.S. Application Data

(60) Provisional application No. 60/508,966, filed on Oct. 6, 2003.

(30) Foreign Application Priority Data

Mar. 21, 2003    (FR)    ................... 03 03494

(51) Int. Cl.
| F16L 11/04 | (2006.01) |
| B29D 23/00 | (2006.01) |
| B32B 1/08 | (2006.01) |
| B32B 27/08 | (2006.01) |
| B32B 37/00 | (2006.01) |

(52) U.S. Cl. .............. 428/36.91; 428/474.7; 428/476.3; 264/171.27; 264/171.28; 264/512; 264/515

(58) Field of Classification Search .............. 428/474.4, 428/474.7, 474.9, 475.5, 475.8, 476.1, 476.3, 428/476.9
See application file for complete search history.

(56) References Cited

U.S. PATENT DOCUMENTS

| 5,278,229 | A |   | 1/1994 | Asano et al. |
| 5,850,855 | A |   | 12/1998 | Kerschbaumer et al. |
| 6,299,984 | B1 | * | 10/2001 | Forloni .................... 428/474.4 |
| 6,794,048 | B2 | * | 9/2004 | Schmitz et al. .......... 428/474.7 |
| 6,875,520 | B2 | * | 4/2005 | Court et al. .............. 428/475.5 |
| 2002/0082352 | A1 |   | 6/2002 | Schmitz et al. |
| 2003/0152725 | A1 |   | 8/2003 | Delius et al. |
| 2003/0199635 | A1 |   | 10/2003 | Court et al. |

FOREIGN PATENT DOCUMENTS

| EP | 0 568 707 A | 11/1993 |
| EP | 0 935 423 B1 | 8/1999 |
| RU | 2 156 782 C1 | 9/2000 |
| WO | WO 02 28959 A | 4/2002 |

OTHER PUBLICATIONS

Abstract of RU 2 156 782 C1, Borodaev et al. "Thermoplastic polymeric composition", RU 2 156 782 C1 Reference published Sep. 27, 2000.

* cited by examiner

Primary Examiner—Rena L Dye
Assistant Examiner—Walter B Aughenbaugh
(74) Attorney, Agent, or Firm—Millen, White, Zelano & Branigan, P.C.

(57) ABSTRACT

The present invention relates to a multilayer structure based on polyamides and graft copolymers having polyamide blocks, comprising, in this order:
  a) a first layer (1) formed from a polyamide (A) or else a polyamide (A)/polyolefin (B) blend having a polyamide matrix;
  b) optionally, a tie layer (2a);
  c) a layer (2) based on a graft copolymer having polyamide blocks, formed from a polyolefin backbone and from at least one polyamide graft in which:
    the grafts are attached to the backbone by the residues of an unsaturated monomer (X) having a functional group capable of reacting with a polyamide having an amine end group;
    the residues of the unsaturated monomer (X) are attached to the backbone by grafting or copolymerization via its double bond;
    the layers (1), (2a) and (2) being successive and adhering to one another in their respective contact region.

One particularly useful application relates to tubes for cooling circuits of internal combustion engines, such as the engines of cars or lorries.

31 Claims, No Drawings

MULTILAYER STRUCTURE BASED ON POLYAMIDES AND GRAFT COPOLYMERS HAVING POLYAMIDE BLOCKS

This application claims the benefit of the filing date of U.S. Provisional Application Ser. No. 60/508,966 filed Oct. 6, 2003.

The entire disclosure of all applications, patents and publications, cited herein and of corresponding U.S. Provisional Application Ser. No. 60/508,966, filed Oct. 10, 2003, is incorporated by reference herein.

FIELD OF THE INVENTION

The present invention relates to structures based on polyamides and on graft copolymers having polyamide blocks. They comprise, in this order, a polyamide layer, optionally a tie layer and a layer of graft copolymers having polyamide blocks. These structures are useful for producing tanks, containers, bottles, multilayer films and tubes. They may be manufactured by coextrusion or coextrusion-blow moulding. Advantageously, in the above articles the layer of graft copolymers having polyamide blocks forms the inner layer in contact with the fluid stored or transported.

One particularly useful application relates to tubes for cooling circuits of internal combustion engines, such as engines for cars or lorries. The cooling liquids are generally aqueous solutions of alcohols such as, for example, ethylene glycol, diethylene glycol or propylene glycol. These tubes must also have good mechanical strength and withstand the engine environment (temperature, possible presence of oil). These tubes are manufactured by coextruding the various layers using standard techniques for thermoplastics. They may be smooth (with a constant diameter) or annulate or have annulate parts and smooth parts.

PRIOR ART AND THE TECHNICAL PROBLEM

U.S. Pat. No. 5,560,398 discloses tubes for a cooling circuit, these being formed from an outer polyamide layer and an inner layer chosen from polyolefins, fluoropolymers, polyesters and EVAs (ethylene/vinyl acetate copolymers).

U.S. Pat. No. 5,716,684 discloses tubes for a cooling circuit, these being formed from an outer polyamide layer and an inner PVDF layer. A tie may be placed between these two layers.

U.S. Pat. No. 5,706,864 discloses tubes for a cooling circuit, these being formed from an outer polyamide layer and an inner layer either made of PVDF or of a polyolefin or of a polyolefin grafted by a carboxylic acid anhydride. A tie may be placed between these two layers.

U.S. Pat. No. 5,850,855 discloses tubes for a cooling circuit, these consisting, in this order, of an outer layer of a polyamide having amine terminal groups, a layer of polyethylene grafted by maleic anhydride and an inner layer made of a polyolefin or of HDPE (high-density polyethylene) grafted by silanes. According to one embodiment, they consist, in this order, of an outer layer of a polyamide having amine terminal groups, a layer of a polypropylene grafted by maleic anhydride and an inner layer which is a blend of polypropylene and an EPDM elastomer (ethylene-propylene-diene elastomer).

The tubes that have an inner layer made of a fluoropolymer are highly resistant to the cooling liquid but are very expensive and difficult to extrude.

Graft copolymers having polyamide blocks have now been found that are particularly resistant to the cooling liquid even at high temperature. These polymers are known per se, but structures based on polyamides and on these polymers have never been disclosed.

U.S. Pat. No. 3,976,720 discloses graft copolymers having polyamide blocks and their use as a compatibilizer in polyamide/polyolefin blends. The process starts by polymerizing caprolactam in the presence of N-hexylamine in order to obtain a PA-6 having an amine end group and an alkyl end group. This PA-6 is then attached to a backbone formed from an ethylene/maleic anhydride copolymer by reacting the anhydride with the amine end group of the PA-6. A graft copolymer having polyamide blocks is thus obtained, this being used in an amount from 2 to 5 parts by weight in order to compatibilize blends comprising 75 to 80 parts of PA-6 and 20 to 25 parts of high-density polyethylene (HDPE). In these blends, the polyethylene is dispersed in the form of 0.3 to 0.5 µm nodules in the polyamide.

U.S. Pat. No. 3,963,799 is very similar to the previous one; this specifies that the flexural modulus of the PA-6/HDPE/compatibilizer blends is around 210 000 psi to 350 000 psi, i.e. 1 400 to 2 200 MPa.

Patent EP 1036817 discloses graft copolymers similar to those described in the aforementioned US patents and their use as a primer or a binder for inks or paints on a polyolefin substrate. For these uses, the copolymers are applied as a solution in toluene.

U.S. Pat. No. 5342886 discloses polymer bends comprising a compatibilizer and more particularly polyamide/polypropylene blends. The compatibilizer is formed from a polypropylene backbone on which polyamide grafts are attached. This compatibilizer is prepared from a polypropylene homopolymer or copolymer (the backbone) onto which maleic anhydride is grafted. Prepared separately is a monoamine-terminated polyamide, that is to say a polyamide having an amine end group and an alkyl end group. The monoamine-terminated polyamide is attached, by melt blending, to the polypropylene backbone by reaction between the amine functional group and the maleic anhydride.

Patent application WO 0228959 discloses blends comprising, by weight, the total being 100%, 1 to 100% of a graft copolymer having polyamide blocks formed from a polyolefin backbone and from, on average, at least one polyamide graft in which:

the grafts are attached to the backbone by the residues of an unsaturated monomer (X) having a functional group capable of reacting with a polyamide having an amine end group;

the residues of the unsaturated monomer (X) are attached to the backbone by grafting or copolymerization via its double bond;

99 to 0% of a flexible polyolefin having an elastic modulus in bending of less than 150 MPa at 23° C. and having a crystalline melting point of between 60° C. and 100° C.

These blends are useful for making adhesives, films, tarpaulins and geomembranes, produced by extrusion, calendering or thermosheathing/thermoforming, and protective layers for electrical cables and skins using the technique of slush moulding.

BRIEF DESCRIPTION OF THE INVENTION

The present invention relates to a multilayer structure based on polyamides and graft copolymers having polyamide blocks, comprising, in this order:

a) a first layer (1) formed from a polyamide (A) or else a polyamide (A)/polyolefin (B) blend having a polyamide matrix;

b) optionally, a tie layer (2a);

c) a layer (2) based on a graft copolymer having polyamide blocks, formed from a polyolefin backbone and from at least one polyamide graft in which:

the grafts are attached to the backbone by the residues of an unsaturated monomer (X) having a functional group capable of reacting with a polyamide having an amine end group;

the residues of the unsaturated monomer (X) are attached to the backbone by grafting or copolymerization via its double bond;

the layers (1), (2a) and (2) being successive and adhering to one another in their respective contact region.

According to one embodiment, the structure includes a polyamide or polyolefin, layer (3), this layer being placed aside the layer (2), and an optionally tie layer (3a) being placed between the layer (2) and the layer (3).

These structures are useful for making tanks, containers, bottles, multilayer films and tubes. They may be manufactured by coextrusion or coextrusion-blow moulding.

The invention also relates to these tanks, containers, bottles, multilayer films and tubes.

Advantageously, in these abovementioned articles, the layer (2) of graft copolymers having polyamide blocks or the layer (3) forms the inner layer in contact with the stored or transported fluid.

The invention also relates to these tanks, containers, bottles, multilayer films and tubes in which the layer (2) of graft copolymers having polyamide blocks or the layer (3) forms the inner layer in contact with the stored or transported fluid.

One particularly useful application relates to tubes for the cooling circuits of internal combustion engines, such as the engines for cars or lorries.

According to another embodiment, the invention also relates to multilayer articles such as tanks, containers, bottles, films and tubes formed from the material of the above layer (2).

The invention also relates to the use of these articles.

DETAILED DESCRIPTION OF THE INVENTION

With regard to the layer (1) made of polyamide (A), the term "polyamide" is understood to mean products resulting from the condensation:

of one or more amino acids, such as aminocaproic, 7-aminoheptanoic, 11-aminoundecanoic and 12-aminododecanoic acid or of one or more lactams, such as caprolactam, oenantholactam and lauryllactam;

of one or more salts or mixtures of diamines such as hexamethylenediamine, dodecamethylenediamine, metaxylenediaamine, bis(p-aminocyclohexyl)methane and trimethylhexamethylenediamine with diacids such as isophthalic, terephthalic, adipic, azelaic, suberic, sebacic and dodecanedicarboxylic acids.

As examples of polyamides, mention may be made of PA-6 and PA-6,6.

It may also be advantageous to use copolyamides. Mention may be made of the copolyamides resulting from the condensation of at least two alpha, omega-aminocarboxylic acids or of two lactams or of a lactam and of an alpha, omega-aminocarboxylic acid. Mention may also be made of the copolyamides resulting from the condensation of at least one alpha, omega-aminocarboxylic acid (or a lactam), at least one diamine and at least one dicarboxylic acid.

As examples of lactams, mention may be made of those which have from 3 to 12 carbon atoms on the main ring and are possibly substituted. Mention may be made, for example, of β,β-dimethylpropriolactam, α,α-dimethylpropriolactam, amylolactam, caprolactam, capryllactam and lauryllactam.

As examples of alpha, omega-aminocarboxylic acids, mention may be made of aminoundecanoic acid and aminododecanoic acid. As examples of dicarboxylic acids, mention may be made of adipic acid, sebacic acid, isopthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid $HOOC-(CH_2)_{10}-COOH$.

The diamine may be an aliphatic diamine having from 6 to 12 carbon atoms; it may be a saturated cyclic and/or arylic diamine. As examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM), and bis(3-methyl-4-aminocyclohexyl) methane (BMACM).

As examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA 6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-amino undecanoic acid, adipic acid and hexamethylenediamine (PA-6/6,6/11/12), and copolymers of lauryllactam, azelaic acid and hexamethylenediamine (PA-6,9/12).

Advantageously, the copolyamide is chosen from PA-6/12 and PA-6/6,6.

It is also possible to use polyamide blends. Advantageously, the relative viscosity of the polyamides, measured as 1% solution in sulphuric acid at 20° C., is between 1.5 and 6.

It would not be outside the scope of the invention to replace part of the polyamide (A) with a copolymer having polyamide blocks and polyether blocks, that is to say by using a blend comprising at least one of the above polyamides and at least one copolymer having polyamide blocks and polyether blocks.

The copolymers having polyamide blocks and polyether blocks result from the copolycondensation of polyamide blocks having reactive ends with polyether blocks having reactive ends, such as, inter alia:

1) polyamide blocks having diamine chain ends with polyoxyalkylene blocks having dicarboxylic chain ends;

2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;

3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

The polyether may, for example, be a polyethylene glycol (PEG), a polypropylene glycol (PPG) or a polytetramethylene glycol (PTMG). The latter is also called polytetrahydrofuran (PTHF).

The number-average molar mass $\overline{M}_n$ of the polyamide blocks is between 300 and 15 000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react polyetherdiol, a lactam (or an alpha, omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into diamine polyethers and condensed with polyamide blocks having carboxylic ends. They may also be mixed with polyamide precursors and a chain stopper in order to make polyamide-block and polyether-block polymers having randomly distributed units.

Polymers having polyamide and polyether blocks are described in U.S. Pat. Nos. 4,331,786, 4,115,475, 4,195,015, 4,839,441, 4,864,014, 4,230,838 and 4,332,920.

The ratio of the amount of copolymer having polyamide blocks and polyether blocks to the amount of polyamide is, by weight, advantageously between 10/90 and 60/40. Mention may be made, for example, of blends of (i) PA6 and (ii) a copolymer having PA-6 blocks and PTMG blocks and blends of (i) PA-6 and (ii) a copolymer having PA-12 blocks and PTMG blocks.

This polyamide (A) is advantageously a PA-11 or a PA-12. Advantageously, this polyamide of the layer (1) is plasticized by standard plasticizers, such as n-butylbenzenesulfonamide (BBSA), the copolymers comprising polyamide blocks and polyether blocks, and maleated EPRs and EPRs.

With regard to the layer (1) made of a polyamide (A)/polyolefin (B) blend having a polyamide matrix, the polyamide may be chosen from the above polyamides. Advantageously, PA-6, PA-6,6 and PA-6/6,6 are used.

As regards the polyolefin (B) of the polyamide (A)/polyolefin (B) blend having a polyamide matrix, this may be functionalized or unfunctionalized or may be a blend of at least one functionalized polyolefin and/or at least one unfunctionalized polyolefin. To simplify matters, functionalized polyolefins (B1) and unfunctionalized polyolefins (B2) are described below.

An unfunctionalized polyolefin (B2) is conventionally a homopolymer or an alpha-olefin or diolefin copolymer, such as, for example, ethylene, propylene, 1-butene, 1-octene and butadiene. By way of example, mention may be made of:

polyethylene homopolymers and copolymers, particularly LDPE, HDPE, LLDPE (linear low-density polyethylene), VLDPE (very low-density polyethylene) and metallocene polyethylene;

propylene homopolymers or copolymers;

ethylene/alpha-olefin copolymers, such as ethylene/propylene, EPR (the abbreviation for ethylene/propylene rubber) and ethylene/propylene/diene (EPDM);

styrene/ethylene-butene/styrene (SEBS), styrene/butadiene/styrene (SBS), styrene/isoprene/styrene (SIS) and styrene/ethylene-propylene/styrene (SEPS) block copolymers;

copolymers of ethylene with at least one product chosen from salts or esters of unsaturated carboxylic acids, such as alkyl (meth)acrylate (for example methyl acrylate), or vinyl esters of saturated carboxylic acids, such as vinyl acetate (EVA), the proportion of comonomer possibly being up to 40% by weight.

The functionalized polyolefin (B1) may be an alpha-olefin polymer having reactive groups (functional groups); such reactive groups are acid, anhydride or epoxy functional groups. As an example, mention may be made of the above polyolefins (B2) grafted or copolymerized or terpolymerized by unsaturated epoxides such as glycidyl methacrylate or by carboxylic acids or the corresponding salts or esters, such as (meth)acrylic acid (the latter possibly being completely or partially neutralized by metals such as Zn, etc.), or else by carboxylic acid anhydrides, such as maleic anhydride. A functionalized polyolefin is, for example, a PE/EPR blend, the weight ratio of which may vary widely, for example between 40/60 and 90/10, the said blend being cografted with an anhydride, especially maleic anhydride, with a grafting ratio of, for example, 0.01 to 5% by weight.

The functionalized polyolefin (B1) may be chosen from the following (co)polymers grafted with maleic anhydride or glycidyl methacrylate, in which the degree of grafting is, for example, from 0.01 to 5% by weight:

PE, PP, copolymers of ethylene with propylene, butene, hexene or octene, containing for example from 35 to 80% ethylene by weight;

ethylene/alpha-olefin copolymers, such as ethylene/propylene, EPR (the abbreviation for ethylene/propylene rubber) and ethylene/propylene/diene (EPDM);

styrene/ethylene-butene/styrene (SEBS), styrene/butadiene/styrene (SBS), styrene/isoprene/styrene (SIS) and styrene/ethylene-propylene/styrene (SEPS) block copolymers;

ethylene-vinyl acetate copolymers (EVA) containing up to 40% vinyl acetate by weight;

ethylene-alkyl (meth)acrylate copolymers containing up to 40% alkyl (meth)acrylate by weight; and ethylene-vinyl acetate (EVA)/alkyl (meth)acrylate copolymers containing up to 40% by weight of comonomers.

The functionalized polyolefin (B1) may also be chosen from ethylene/propylene copolymers comprising predominantly propylene, these copolymers being grafted by maleic anhydride and then condensed with a monoamine polyamide (or a polyamide oligomer) (products described in EP-A-0 342 066).

The functionalized polyolefin (B1) may also be a copolymer or terpolymer of at least the following units: (1) ethylene; (2) an alkyl (meth)acrylate or a vinyl ester of a saturated carboxylic acid and (3) an anhydride, such as maleic anhydride or (meth)acrylic acid or epoxy such as glycidyl (meth)acrylate.

As examples of functionalized polyolefins of the latter type, mention may be made of the following copolymers, in which ethylene preferably represents at least 60% by weight and in which the termonomer (the functional group) represents, for example, from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers; and ethylene/vinyl acetate or alkyl (meth)acrylate/(meth) acrylic acid or maleic or glycidyl methacrylate anhydride copolymers.

In the above copolymers, the (meth)acrylic acid may be salified with Zn or Li.

The term "alkyl (meth)acrylate" in (B1) or (B2) denotes C1 to C8 alkyl acrylates and methacrylates, these possibly being chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the aforementioned polyolefins (B1) may also be crosslinked by any process or suitable agent (diepoxy, diacid, peroxide, etc.); the term "functionalized polyolefin" also includes blends of the aforementioned polyolefins with a difunctional reactant, such as a diacid, dianhydride, diepoxy, etc., capable of reacting with them, or blends of at least two functionalized polyolefins which can react together.

The copolymers mentioned above, (B1) and (B2), may be random copolymers or block copolymers and have a linear or branched structure.

The molecular weight, the MFI and the density of these polyolefins may also vary widely, as a person skilled in the art will appreciate. MFI is the abbreviation for Melt Flow Index, which is measured according to the ASTM 1238 standard.

Advantageously, the unfunctionalized polyolefins (B2) are chosen from polypropylene homopolymers or copolymers and any ethylene homopolymer or copolymer of ethylene with a comonomer of the higher alpha-olefin type, such as butene, hexene, octene or 4-methyl-1-pentene. Mention may be made, for example, of PP, high-density PE, medium-density PE, linear low-density PE, low-density PE and very low-density PE. These polyethylenes are known to a person skilled in the art as being produced according to a "radical" process, using catalysis of the "Ziegler" type or, more recently, using catalysis referred to as "metallocene" catalysis.

Advantageously, the functionalized polyolefins (B1) are chosen from any polymer comprising alpha-olefin units and units carrying polar reactive functional groups, such as epoxy, carboxylic acid or carboxylic acid anhydride functional groups. As examples of such polymers, mention may be made of ethylene-alkyl acrylate-maleic anhydride or glycidyl methacrylate terpolymers, such as the Applicant's LOTADER® polymers, or polyolefins grafted by maleic anhydride, such as the Applicant's OREVAC® polymers, and ethylene-alkyl acrylate-(meth)acrylic acid terpolymers or ethylenevinyl acetate-maleic anhydride terpolymers. Mention may also be made of polypropylene homopolymers or copolymers grafted by a carboxylic acid anhydride and then condensed with polyamides or monoamine polyamide oligomers.

The MFI of (A) and the MFIs of (B1) and (B2) may be chosen within a wide range; however, it is recommended, for facilitating the dispersion of (B), that the viscosities of (A) and (B) differ little.

For small proportions of (B), for example 10 to 15 parts, it is sufficient to use an unfunctionalized polyolefin (B2). The proportion of (B2) and (B1) in the phase (B) depends on the amount of functional groups present in (B1) and on their reactivity. Advantageously, (B1)/(B2) weight ratios ranging from 5/35 to 15/25 are used. It is also possible to use only a blend of polyolefins (B1) in order to obtain crosslinking.

The polyamide (A)/polyolefin (B) blend has a polyamide matrix. Usually it is sufficient for the proportion of polyamide of the polyamide (A)/polyolefin (B) blend to be at least 40% by weight and preferably between 40 and 75% and better still between 50 and 75% in order for there to be a polyamide matrix. This is the case of the first three preferred embodiments of the polyamide/polyolefin blend. In the fourth preferred embodiment, the polyolefin phase is crosslinked, thereby ensuring that there is no phase inversion and the material remains with a polyamide matrix.

According to a first preferred embodiment of the polyamide (A)/polyolefin (B) blend having a polyamide matrix, the polyolefin (B) comprises (i) a high-density polyethylene (HDPE) and (ii) a blend of a polyethylene (C1) and of a polymer (C2) chosen from elastomers, very low-density polyethylenes and ethylene copolymers, the (C1)+(C2) blend being cografted by an unsaturated carboxylic acid or an unsaturated carboxylic acid anhydride.

According to a variant of this first embodiment of the invention, the polyolefin (B) comprises (i) a high-density polyethylene (HDPE), (ii) a polymer (C2) chosen from elastomers, very low-density polyethylenes and ethylene copolymers (C2) being grafted by an unsaturated carboxylic acid, and (iii) a polymer (C'2) chosen from elastomers, very low-density polyethylenes and ethylene copolymers.

According to a second preferred embodiment of the polyamide (A)/polyolefin (B) blend having a polyamide matrix, the polyolefin (B) comprises (i) polypropylene and (ii) a polyolefin which results from the reaction of a polyamide (C4) with a copolymer (C3) comprising propylene and an unsaturated monomer X, which is grafted or copolymerized.

According to a third preferred embodiment of the polyamide (A)/polyolefin (B) blend having a polyamide matrix, the polyolefin (B) comprises (i) a polyethylene of the EVA, LLDPE, VLDPE or metallocene type and (ii) an ethylene/ alkyl (meth)acrylate/maleic anhydride copolymer.

According to a fourth preferred embodiment of the polyamide (A)/polyolefin (B) blend having a polyamide matrix, the polyolefin comprises two functionalized polymers comprising at least 50 mol % of ethylene units and able to react to form a crosslinked phase. According to a variant, the polyamide (A) is chosen from blends of (i) a polyamide and (ii) a copolymer having PA-6 blocks and PTMG blocks, and blends of (i) a polyamide and (ii) a copolymer having PA-12 blocks and PTMG blocks, the ratio of the amounts of copolymer to polyamide by weight being between 10/90 and 60/40.

With regard to the tie layers (2a) and (3a), these thus define any product allowing good adhesion between the layers in question. The tie is advantageously chosen from functionalized polyolefins and from copolyamides.

As an example of ties based on functionalized polyolefins, mention may be made of:

polyethylene, polypropylene, copolymers of ethylene with at least one alpha-olefin, blends of these polymers, all these polymers being grafted by unsaturated carboxylic acid anhydrides such as, for example, maleic anhydride, or blends of these grafted polymers and these ungrafted polymers;

copolymers of ethylene with at least one product chosen from (i) unsaturated carboxylic acids, their salts or their esters; (ii) vinyl esters of saturated carboxylic acids; (iii) unsaturated dicarboxylic acids, their salts, their esters, their semiesters or their anhydrides; (iv) unsaturated epoxides; it being possible for these copolymers to be grafted by unsaturated dicarboxylic acid anhydrides such as maleic anhydride or unsaturated epoxides such as glycidyl methacrylate.

As regards the copolyamide-type ties, that can be used in the present invention, these have a melting point (DIN 53736B standard) of between 60 and 200° C. and their relative solution viscosity may be between 1.3 and 2.2 (DIN 53727 standard; solvent: m-cresol; concentration: 0.5 g/100 ml; temperature: 25° C.; viscometer: Ubbelohde). Their melt rheology is preferably similar to that of the materials of the outer layer and of the inner layer.

The copolyamides come, for example, from the condensation of alpha, omega-aminocarboxylic acids, of lactams or of dicarboxylic acids and diamines.

According to a first type, the copolyamides result from the condensation of at least two alpha, omega-aminocarboxylic acids or of at least two lactams having from 6 to 12 carbon atoms or of a lactam and of an aminocarboxylic acid not having the same number of carbon atoms possibly in the presence of a chain stopper which may, for example, be a monoamine or a diamine or a monocarboxylic acid or a dicarboxylic acid. Among chain stoppers, mention may especially be made of adipic acid, azelaic acid, stearic acid and dodecanediamine. The copolyamides of this first type may also include units which are residues of diamines and dicarboxylic acids.

As examples of dicarboxylic acids, mention may be made of adipic acid, nonanedioic acid, sebacic acid and dodecanedioic acid.

As examples of alpha, omega-aminocarboxylic acids, mention may be made of aminocaproic acid, aminoundecanoic acid and aminododecanoic acid.

As examples of lactams, mention may be made of caprolactam and lauryllactam (2-azacyclotridecanone).

According to a second type, the copolyamides result from the condensation of at least one alpha, omega-aminocarboxylic acid (or a lactam), at least one diamine and at least one dicarboxylic acid. The alpha, omega-aminocarboxylic acid, the lactam and the dicarboxylic acid may be chosen from those mentioned above.

The diamine may be a branched, linear or cyclic aliphatic diamine or else an arylic diamine.

As examples, mention may be made of hexamethylenediamine, piperazine, isophoronediamine (IPD), methylpentamethylenediamine (MPDM), bis(aminocyclo-hexyl)methane (BACM) and bis(3-methyl-4-aminocyclo-hexyl)methane (BMACM).

The processes for manufacturing the copolyamides are known from the prior art and these copolyamides may be manufactured by polycondensation, for example in an autoclave.

According to a third type, the copolyamides are a blend of a 6/12 copolyamide rich in 6 and of a 6/12 copolyamide rich in 12. As regards the blend of 6/12 copolyamides, one comprising by weight more 6 than 12 and the other more 12 than 6, the 6/12 copolyamide results from the condensation of caprolactam with lauryllactam. It is clear that "6" denotes the units derived from caprolactam and "12" denotes the units derived from lauryllactam. It would not be outside the scope of the invention if caprolactam were to be replaced completely or partly with aminocaproic acid, and likewise, in the case of lauryllactam, this may be replaced with aminododecanoic acid. These copolyamides may include other units provided that the ratios of the proportions of 6 and 12 are respected.

Advantageously, the copolyamide rich in 6 comprises 60 to 90% by weight of 6 for 40 to 10% of 12, respectively.

Advantageously, the copolyamide rich in 12 comprises 60 to 90% by weight of 12 for 40 to 10% of 6, respectively.

As regards the proportions of the copolyamide rich in 6 and of the copolyamide rich in 12, these may be, by weight, from 40/60 to 60/40 and preferably 50/50.

These blends of copolyamides may also include up to 30 parts by weight of other grafted polyolefins or (co)polyamides per 100 parts of the copolyamides rich in 6 and rich in 12.

These copolyamides have a melting point (DIN 53736B standard) of between 60 and 200° C. and their relative solution viscosity may be between 1.3 and 2.2 (DIN 53727; solvent: m-cresol; concentration: 0.5 g/100 ml; temperature: 25° C.; viscometer: Ubbelohde). Their melt rheology is preferably similar to that of the adjacent layers. These products are manufactured by standard polyamide techniques. Processes are described in the following Patents: U.S. Pat. Nos. 4,424,864, 4,483,975, 4,774,139, 5,459,230, 5,489,667, 5,750,232 and 5,254,641.

With regard to the graft copolymer having polyamide blocks, this may be obtained by reaction between a polyamide having an amine end group and the residues of an unsaturated monomer X attached by grafting or copolymerization on a polyolefin backbone.

This monomer X may, for example, be an unsaturated epoxide or an unsaturated carboxylic acid anhydride. The unsaturated carboxylic acid anhydride may be chosen, for example, from maleic, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic anhydrides.

Advantageously, maleic anhydride is used. It would not be outside the scope of the invention to replace all or part of the anhydride with an unsaturated carboxylic acid such as, for example, (meth)acrylic acid. As examples of unsaturated epoxides, mention may be made of:

aliphatic glycidyl esters and ethers, such as allyl glycidyl ether, vinyl glycidyl ether, glycidyl maleate, glycidyl itaconate, glycidyl (meth)acrylate; and alicyclic glycidyl esters and ethers, such as 2-cyclohex-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

With regard to the polyolefin backbone, the polyolefins may be the unfunctionalized polyolefins mentioned above in the polyamide (A)/polyolefin (B) blends.

Advantageously, the polyolefin backbones on which the residues of X are attached are polyethylenes grafted by X or ethylene-X copolymers obtained, for example, by radical polymerization.

With regard to the polyethylenes on which X is grafted, these are understood to mean polyethylene homopolymers or copolymers.

As homopolymers, mention may be made of:

alpha-olefins, advantageously those having from 3 to 30 carbon atoms. Examples were mentioned above. These alpha-olefins may be used by themselves or as a mixture of two or more than two of them;

unsaturated carboxylic acid esters, such as for example alkyl(meth)acrylates, the alkyls possibly having up to 24 carbon atoms; examples of alkyl acrylates or methacrylates are especially methyl acrylate, ethyl acrylate, n-butyl acrylate, isobutyl acrylate and 2-ethylhexyl acrylate;

vinyl esters of saturated carboxylic acids, such as for example vinyl acetate or vinyl propionate;
dienes such as, for example, 1,4-hexadiene;
the polyethylene may include several of the above comonomers.

Advantageously, the polyethylene, which may be a blend of several polymers, comprises at least 50% and preferably more than 75% (in mols) of ethylene and its density may be between 0.86 and 0.98 g/cm³. The MFI (viscosity index of 190° C./2.16 kg) is advantageously between 5 and 100 g/10 min.

As examples of polyethylenes, mention may be made of:
low-density polyethylene (LDPE);
high-density polyethylene (HDPE);
linear low-density polyethylene (LLDPE);
very low-density polyethylene (VLDPE);
polyethylene obtained by metallocene catalysis;
EPR (ethylene-propylene rubber) elastomers;
EPDM (ethylene-propylene—diene monomer) elastomers;
blends of polyethylenes with an EPR or an EPDM;
ethylene/alkyl (meth)acrylate copolymers possibly containing up to 60% by weight, preferably 2 to 40%, of (meth)acrylate.

Grafting is an operation known per se.

With regard to the ethylene/X copolymers, that is to say those in which X is not grafted if they are copolymers of ethylene with X and optionally with another monomer possibly chosen from the comonomers mentioned above in the case of the ethylene copolymers intended to be grafted.

Advantageously, ethylene/maleic anhydride copolymers and ethylene/alkyl(meth)acrylate/maleic anhydride copolymers are used. These copolymers comprise from 0.2 to 10% by weight of maleic anhydride and from 0 to 40%, preferably from 5 to 40%, by weight of alkyl(meth)acrylate. Their MFI is between 5 and 100 (190° C./2.16 kg). The alkyl(meth)acrylates have already been described above. The melting point is between 60 and 100° C.

Advantageously, there are on average at least 1.3 mol, preferably from 1.3 to 10 and better still from 1.3 to 7 mol, of X per mole of chain attached to the polyolefin backbone. A person skilled in the art may easily determine the number of these moles of X by FTIR analysis.

With regard to the polyamide having an amine end group, the term "polyamide" is understood to mean products resulting from the condensation:
of one or more amino acids, such as aminocaproic, 7-aminoheptanoic, 11-aminoundecanoic and 12-aminododecanoic acid or of one or more lactams, such as caprolactam, oenantholactam and lauryllactam;
of one or more salts or mixtures of diamines such as hexamethylenediamine, dodecamethylenediamine, metaxylylenediamine, bis(p-aminocyclohexyl)methane and trimethylhexamethylenediamine with diacids such as isophthalic, terephthalic, adipic, azelaic, suberic, sebacic and dodecanedicarboxylic acids;
or mixtures of several monomers, resulting in copolyamides.

Polyamide/copolyamide blends may be used. Advantageously, PA-6, PA-11, PA-12, the copolyamide having 6 units and 11 units (PA-6/11), the copolyamide having 6 units and 12 units (PA-6/12) and the copolyamide based on caprolactam, 11-amino undecanoic acid and lauryllactam (PA-6/11/12) are used. The advantage of copolyamides is that it is thus possible to choose the melting point of the grafts.

Advantageously, the grafts are homopolymers or copolymers consisting of residues of caprolactam, 11-amino-undecanoic acid and dodecalatam, or copolyamides consisting of residues chosen from at least two of the three above monomers.

The degree of polymerization may vary widely; depending on its value, this is a polyamide or a polyamide oligomer. In the rest of the text, the two expressions for the grafts will be used without distinction.

In order for the polyamide to have a monoamine terminal group, all that is required is to use a chain stopper of formula:

in which:
$R_1$ is hydrogen or a linear or branched alkyl group containing up to 20 carbon atoms;
$R_2$ is a linear or branched, alkyl or alkenyl, group having up to 20 carbon atoms, a saturated or unsaturated cycloaliphatic radical, an aromatic radical or a combination of the above. The chain stopper may, for example, be laurylamine or oleylamine.

Advantageously, the polyamide having an amine end group has a molar mass of between 1 000 and 5 000 g/mol and preferably between 2 000 and 4 000 g/mol.

The preferred amino acid or lactam monomers for synthesizing the monoamine aligomer according to the invention are chosen from caprolactam, 11-amino-undecanoic acid or dodecalactam. The preferred monofunctional polymerization stoppers are laurylamine and oleylamine.

The polycondensation defined above is carried out using standard known processes, for example at a temperature generally between 200 and 300° C., in a vacuum or in an inert atmosphere, with stirring of the reaction mixture. The average chain length of the oligomer is determined by the initial molar ratio of the polycondensable monomer or the lactam to the monofunctional polymerization stopper. To calculate the mean chain length, it is usual practice to count one chain limiter molecule per oligomer chain.

The addition of the monoamine polyamide oligomer to the polyolefin backbone containing X is effected by an amine functional group of the oligomer reacting with X. Advantageously, X carries an anhydride or acid functional group; amide or imide links are thus created.

The oligomer having an amine end group is added to the polyolefin backbone containing X preferably in the melt state. Thus, it is possible, in an extruder, to mix the oligomer with the backbone at a temperature generally between 180° and 250° C. The mean residence time of the melt in the extruder may be between 15 seconds and 5 minutes, preferably between 1 and 3 minutes. The efficiency of this addition is evaluated by selective extraction of the free polyamide oligomers, that is to say those that have not reacted to form the final graft copolymer having polyamide blocks.

The proportion of polyolefin backbone containing X (abbreviated to PO) to the proportion of polyamide having an amine end group (abbreviated to PA) is such that:PO/PA is between 55/45 and 90/10 and advantageously between 60/40 and 80/20.

The preparation of such polyamides having an amine end group and their addition to a polyolefin backbone containing X is described in U.S. Pat. Nos. 3,976,720, 3,963,799, 5,342, 886 and FR 2291225.

The graft copolymers having polyamide blocks of the present invention are characterized by a nanostructured organization with polyamide lamellae having a thickness of between 10 and 50 nanometres.

With regard to the embodiment in which the structure comprises a layer (3), the polyamide of this layer may be chosen from the polyamide or the polyamide/polyolefin blends having a polyamide matrix of the layer (1). It may be identical to or different from the layer (1). The polyolefin of this layer (3) may be chosen from the abovementioned functionalized or unfunctionalized polyolefins in the layer (1). If this layer (3) is advantageously a polyolefin, it is propylene.

More particularly with regard to tubes for cooling circuits, these may, for example, have an inside diameter of 5 to 100 mm and a thickness of 1 to 10 mm. As regards the thicknesses of the layers, these are advantageously 30 to 95% of the total thickness in the case of the layer 1, 5 to 60% in the case of the layer 2, 5 to 30% in the case of each layer 2 and 3a and 5 to 40% in the case of the layer 3, the total being 40%.

EXAMPLES

Example 1

An ethylene/butyl acrylate/maleic anhydride terpolymer containing 5 to 7% acrylate and 2.8 to 3.4% maleic anhydride by weight, having a melt index of 6 g/10 min (at 2.16 kg/190° C.) was mixed in a Leistritz® corotating twin-screw extruder equipped with several mixing zones, having a temperature profile between 180 and 220° C., with a PA-11 of 2 500 g/mol molecular mass having an amine end group, synthesized according to the method described in U.S. Pat. No. 5,342,886. This terpolymer contained on average between 1 and 3 anhydride groups per chain. The proportions introduced into the extruder were such that the polyolefin of the backbone/polyamide having an amine end group ratio was 80/20 by weight.

We therefore produced plaques by compression moulding using an ENERPAC® press using the following conditions:
before each compression, the granules were placed for about 10 minutes in an oven at 100° C.

We produced 3 plaques of this specimen, each plaque required at least two passes (in order to avoid any bubbles) with, between each pressing, a cutting (into 4), an oven annealing operation (at 100° C.) and juxtaposition of the pieces.

All the test pieces were therefore separated into 2:
a $1^{st}$ part (control) for determining the properties before ageing;
a $2^{nd}$ part for determining the properties after 1 000 hours at 130° C. in a 50/50 water/glycol mixture.

Thus, we placed the second part of the test pieces in a "bomb"-type autoclave reactor capable of withstanding the pressure containing a 50/50 water/ethylene glycol mixture by weight, and this reactor was also placed in an oven at 130° C.

Creep:

Before carrying out the creep tests (ISO 899 Standard) we had to condition the products so as in the end to obtain test pieces of the "IFC (abbreviation for d'Institut Frangais du Caoutchouc) [French Rubber Institute]) type" and we therefore cut these test pieces into plaques. The creep tests consisted in imposing a constant stress on a material at a given temperature and in monitoring its deformation over time. The initial stress (constant force) was proportional to the area of the central cross section of the test piece. Then, after 15 minutes, the test piece was recovered and the elongation with respect to the initial reference length after cooling was measured and the creep deformation was thus obtained.

Stress at Break, Elongation at Break and Flexural Modulus:

For these measurements, the tension/compression machine used was an MTS Systems DY 21 B No. 525", the standard was the "ISO 527-2" reference and the test pieces were of the "Type 5A" (cut from the plaques). The measurements were carried out with a pull rate of 100 mm/min.

Results:

We therefore measured the creep in our tests (before and after ageing) at 120° C. under a stress of 2 bar:

| Creep Conditioning | Control | 1 000 h at 130° C. in water/glycol |
|---|---|---|
| Elongation after 15 min at 120° C. and 2 bar | 0% | 0% |

The tests after ageing gave the same creep characteristics as the base.

Each specimen was also tested in tension before measuring the stress and elongation break and the modulus of elasticity. The results are given in the following table:

| | Tension | | | |
|---|---|---|---|---|
| | Max. Stress MPa | Stress at break Mpa | Elongate at break % | Modulus of elasticity MPa |
| Control | 16.3 | 16.1 | 313 | 24.3 |
| After ageing in glycol | 19.5 | 19.3 | 302 | 23.8 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirt and scope thereof, can make variouschanges and modifications of the invention to adapt it to various usages and conditions.

The entire disclosure of all applications, patents and publications, cited herein and of corresponding French application No. 03/03494, filed Mar. 21, 2003 is incorporated by reference herein.

The invention claimed is:

1. A multilayer structure comprising, in this order:
a) a first layer (1) comprising a polyamide (A) or a polyamide (A)/polyolefin (B) blend having a polyamide matrix;
b) optionally, a tie layer (2a);
c) a polymeric layer (2) wherein the polymer comprises a graft copolymer having polyamide blocks, said graft copolymer comprising a polyolefin backbone and at least one polyamide graft from a polyamide having an amine end group, wherein:
the grafts are attached to the polyolefin backbone by the residues of an unsaturated monomer (X) having a functional group capable of reacting with said polyamide having an amine end group;
the residues of said unsaturated monomer (X) being attached to the backbone by grafting or copolymerization via its double bond; and the average number of moles of unsaturated monomer X attached to the polyolefin backbone is 1.3 to 7 moles per mole of chain;

layer (1), optionally layer (2a), and layer (2) being successive and adhering to one another in their respective contact region, wherein the proportion by weight of the polyolefin backbone to the polyamide having an amine end group is 80/20 to 90/10, and wherein said multilayer structure is in the form of a tube.

2. A structure according to claim 1, further comprising a polyamide or a polyolefin layer (3), superposed on layer (2), and optionally further comprising a tie layer (3a) placed between layer (2) and layer (3).

3. A structure according to claim 1, wherein said polyolefin backbone comprises an ethylene/alkyl(meth)acrylate copolymer.

4. A structure according to claim 1, in which X is an unsaturated carboxylic acid anhydride.

5. A structure according to claim 1, wherein said polyolefin backbone is chosen from ethylene/maleic anhydride copolymers and ethylene/alkyl(meth)acrylate/maleic anhydride copolymers.

6. A structure according to claim 1, wherein layer (2) forms the inner layer intended to be in contact with the stored or transported fluid.

7. A structure according to claim 1, wherein said structure is in the form of a tube for use in a cooling circuit for an internal combustion engine in which the layer (2) forms the inner layer of said tube, said inner layer intended to be in contact with the transported fluid.

8. A multilayer structure according to claim 1, comprising said tie layer (2a).

9. A structure according to claim 2, comprising said tie layer (3a).

10. A structure according to claim 8, further comprising a polyamide or a polyolefin layer (3) superposed on layer (2) and a tie layer (3a) placed between layer (2) and layer (3).

11. A structure according to claim 1, wherein said polyolefin backbone is a polyolefin homopolymer or copolymer.

12. A structure according to claim 1, wherein X is an unsaturated epoxide, an unsaturated carboxylic acid anhydride, an aliphatic glycidyl ester, an aliphatic glycidyl ether, an alicyclic glycidyl ester or an alicyclic glycidyl ether.

13. A structure according to claim 1, wherein the first layer (1) is formed from a polyamide (A)/polyolefin (B) blend having a polyamide matrix.

14. A structure according to claim 1, wherein said first layer is formed from PA-6/12, PA-6/6,6, PA-6, PA-6,6, PA-11 or PA-12.

15. A structure according to claim 8, wherein said tie layer comprises a functionalized polyolefin or a copolyamide.

16. A structure according to claim 9, wherein said tie layer between layer (2) and layer (3) comprises a functionalized polyolefin or a copolyamide.

17. A method comprising fabricating a tube, said method comprising shaping a multilayer structure according to claim 2 such that layer (3) forms the inner layer.

18. A method of fabricating a tube for use in a cooling circuit of an internal combustion engine, said method comprising shaping a multilayer structure according to claim 2 such that layer (2) comprises graft copolymers having amide blocks, and either said layer (2) or layer (3) forms the inner layer of the tube.

19. A structure according to claim 1, wherein said first layer (1) comprises a blend of a polyamide (A) and at least one copolymer having polyamide blocks and polyether blocks.

20. A structure according to claim 13, wherein the proportion of polyamide in the polyamide (A)/polyolefin (B) blend is between 40 and 75% by weight.

21. A structure according to claim 2, wherein layer (3) forms the inner layer of said structure, said inner layer intended to be in contact with the stored or transported fluid.

22. A structure according to claim 2, wherein said structure is in the form of a tube for use in a cooling circuit for an internal combustion engine, and wherein layer (3) forms the inner layer of said tube, said inner layer intended to be in contact with the stored or transported fluid.

23. A structure according to claim 1, wherein the tie layer (2a) is selected from functionalized polyolefins and copolyamides.

24. A structure according to claim 1, wherein said polyamide having an amine end group has a molar mass of between 1,000 and 5,000 g/mol.

25. A structure according to claim 1, wherein said graft copolymer having polyamide blocks has a nanostructured organization with polyamide lamellae having a thickness of between 10 and 50 nanometers.

26. A structure according to claim 24, wherein said graft copolymer having polyamide blocks has a nanostructured organization with polyamide lamellae having a thickness of between 10 and 50 nanometers.

27. A multilayer structure comprising, in this order:

a) a first layer (1) comprising a polyamide (A) or a polyamide (A)/polyolefin (B) blend having a polyamide matrix;

b) optionally, a tie layer (2a);

c) a polymeric layer (2) wherein the polymer comprises a graft copolymer having polyamide blocks, said graft copolymer comprising a polyolefin backbone and at least one polyamide graft from a polyamide having an amine end group, wherein:

the grafts are attached to the polyolefin backbone by the residues of an unsaturated monomer (X) having a functional group capable of reacting with said polyamide having an amine end group;

the residues of said unsaturated monomer (X) being attached to the backbone by grafting or copolymerization via its double bond; and said polyamide having an amine end group has a molar mass of between 1,000 and 5,000 g/mol;

layer (1), optionally layer (2a), and layer (2) being successive and adhering to one another in their respective contact region, wherein the proportion by weight of the polyolefin backbone to the polyamide having an amine end group is 80/20 to 90/10, and wherein said multilayer structure is in the form of a tube.

28. A multilayer structure comprising, in this order:

a) a first layer (1) comprising a polyamide (A) or a polyamide (A)/polyolefin (B) blend having a polyamide matrix;

b) optionally, a tie layer (2a);

c) a polymeric layer (2) wherein the polymer comprises a graft copolymer having polyamide blocks, said graft copolymer comprising a polyolefin backbone and at least one polyamide graft from a polyamide having an amine end group, wherein:

the grafts are attached to the polyolefin backbone by the residues of an unsaturated monomer (X) having a functional group capable of reacting with said polyamide having an amine end group;

the residues of said unsaturated monomer (X) being attached to the backbone by grafting or copolymerization via its double bond; and graft copolymer having polyamide blocks has a nanostructured organization with polyamide lamellae having a thickness of between 10 and 50 nanometers;

layer (1), optionally layer (2a), and layer (2) being successive and adhering to one another in their respective contact region, wherein the proportion by weight of the polyolefin backbone to the polyamide having an amine end group is 80/20 to 90/10, and wherein said multilayer structure is in the form of a tube.

29. A multilayer structure according to claim 1, wherein the polymeric material of polymeric layer (2) consists of said graft copolymer having polyamide blocks.

30. A multilayer structure according to claim 27, wherein the polymeric material of polymeric layer (2) consists of said graft copolymer having polyamide blocks.

31. A multilayer structure according to claim 28, wherein the polymeric material of polymeric layer (2) consists of said graft copolymer having polyamide blocks.

* * * * *